United States Patent [19]
Garrett et al.

[11] 3,791,610
[45] Feb. 12, 1974

[54] AIRCRAFT EJECTION SEAT ACTUATION SYSTEM

[75] Inventors: John W. Garrett, Bellbrook; Milton Alexander, Fairborn; Ralph R. Riepenhoff, Dayton, all of Ohio

[73] Assignee: The United States of America as represented by the Secretary of the Air Force, Washington, D.C.

[22] Filed: Oct. 19, 1972

[21] Appl. No.: 298,976

[52] U.S. Cl. .......................................... 244/122 A
[51] Int. Cl. ............................................ B63d 25/08
[58] Field of Search ...... 244/122 R, 122 AG, 122 A, 244/122 AB, 122 AC, 122 AD, 122 AE, 122 AF, 84; 74/544, 546

[56] References Cited
UNITED STATES PATENTS
2,829,850 4/1958 Culver .......................... 244/122 AH
2,965,335 12/1960 Bohlin .......................... 244/122 AG
1,821,581 9/1931 Rosatelli ............................. 244/84
2,163,114 6/1939 Ziegler ................................ 244/84
2,514,212 7/1950 Jennings ......................... 74/546 UX FOREIGN PATENTS OR APPLICATIONS
585,274 1/1946 Great Britain ................ 244/122 AE Primary Examiner—Duane A. Reger
Assistant Examiner—Galen L. Barefoot

[57] ABSTRACT

An aircraft seat ejection device including a handle and upright support held in a compressed position, against the urging of separate, built-up springs, within a cover manually operable by the pilot to an open position to free and allow the springs to extend both handle and support into a pop-up position, and open the handle into a hand-gripping position between the legs of the pilot. An actuator-rod, mounted in compressed and telescopic relation within the upright support, and interconnected to a cable attached to the seat ejection-firing mechanism is manually releasable, by the operation of a trigger mounted on the handle, to thereby operate the cable and initiate actuation of the firing mechanism.

10 Claims, 6 Drawing Figures

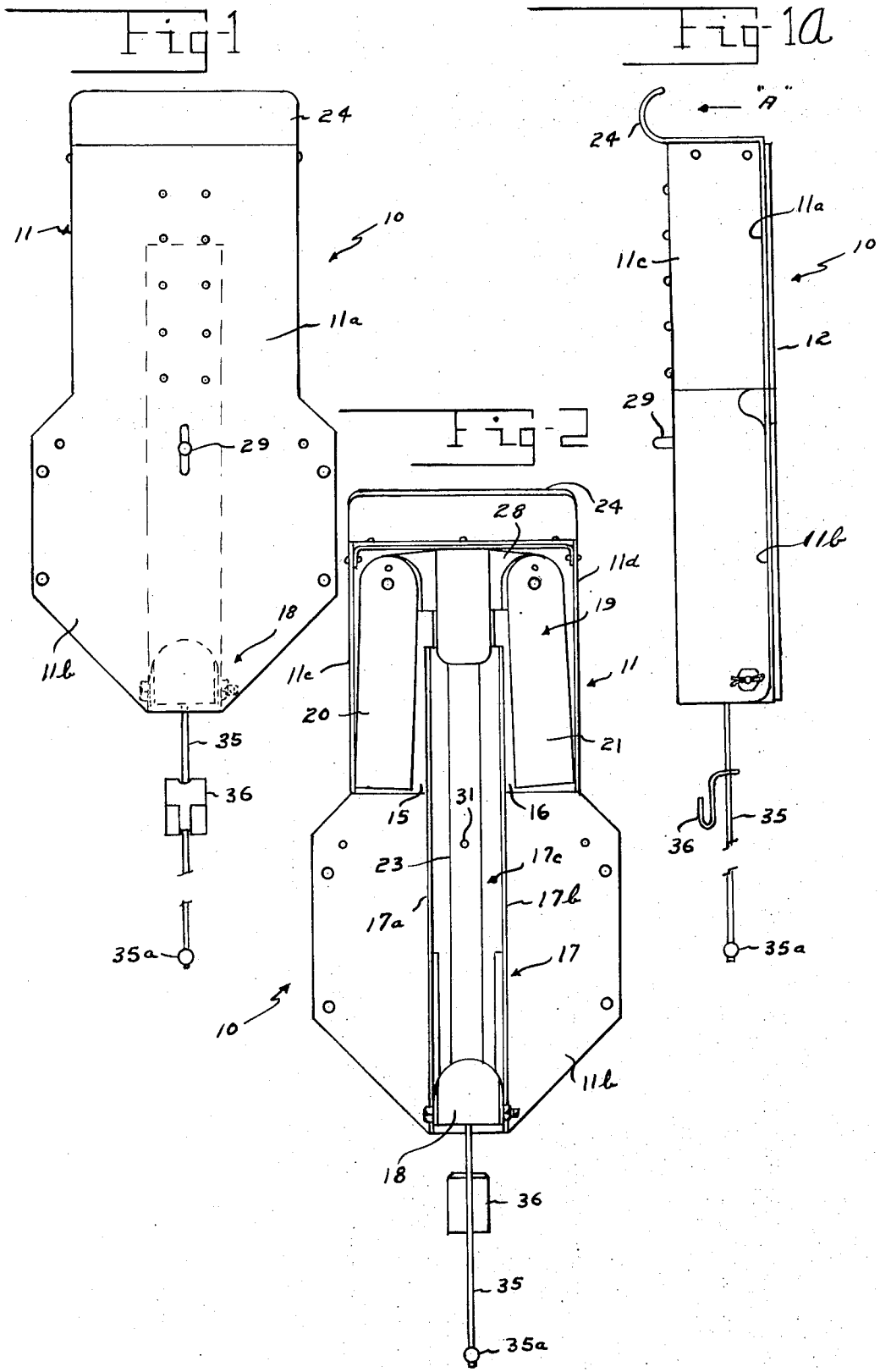

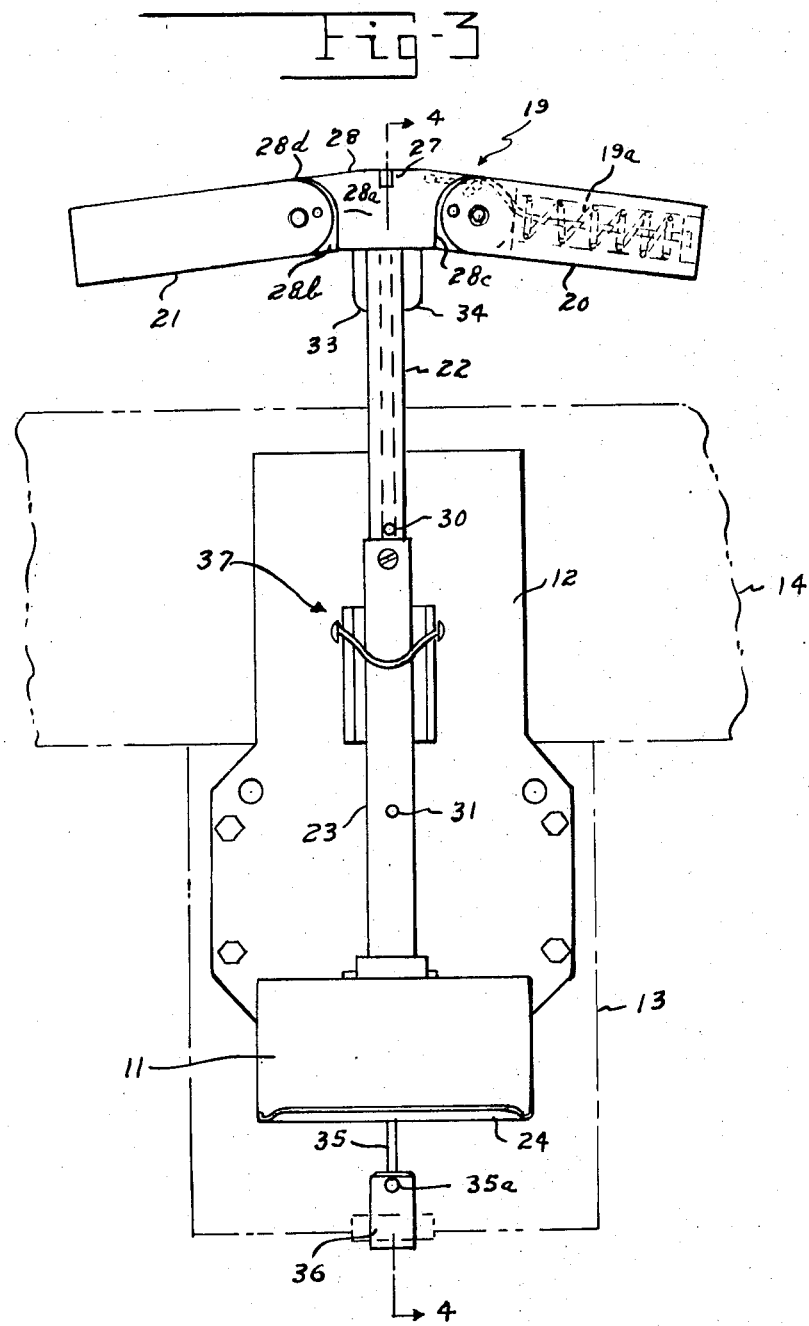

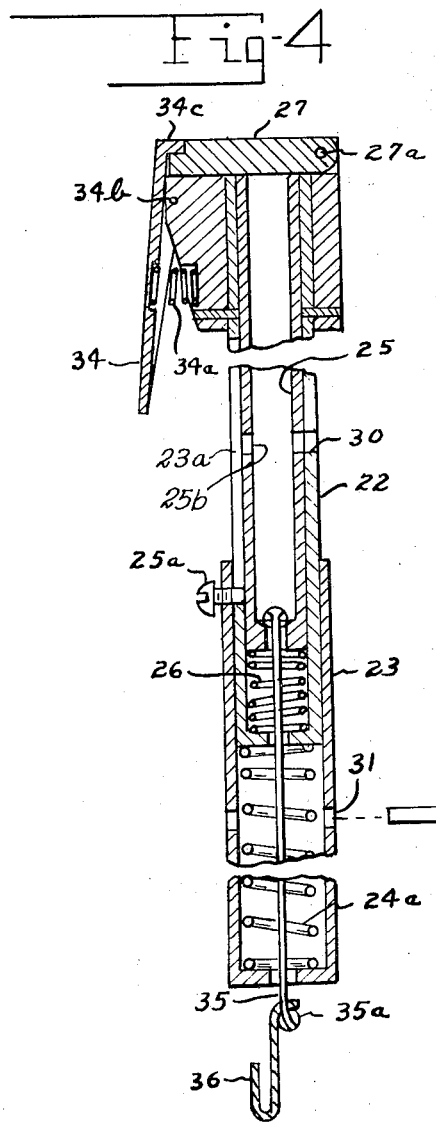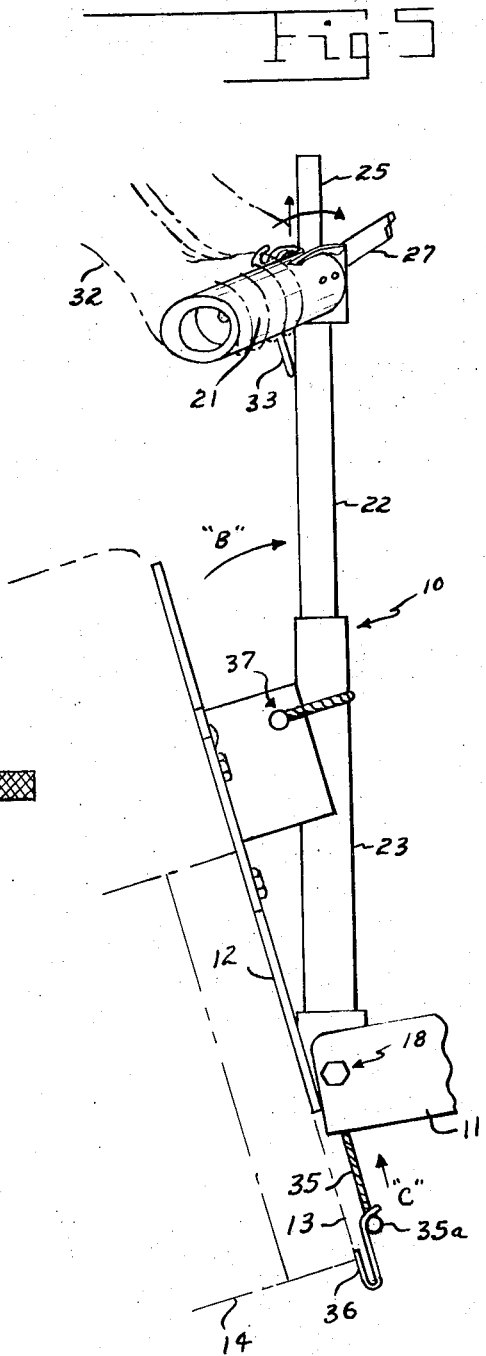

AIRCRAFT EJECTION SEAT ACTUATION SYSTEM

BACKGROUND OF THE INVENTION

This invention relates generally to aircraft ejection seats and, in particular, to an improved means both for preparing for, and initiating the actuation of the ejection seat-firing mechanism.

The ejection seat is the normal means used to escape from a disabled, high speed aircraft. In certain of these aircraft, the firing mechanism for ejecting the aircraft seat and occupant is initiated by the pilot or other aircrew member bending over to grasp a D-ring-type of handle located between his legs at, or near floor level. This action requires the user to assume a rather awkward position resulting in spinal misalignment and thus frequent injury from the high "Q" forces present during the ejection procedure. Injury also often occurs from a loss of the hand grip on the difficult-to-hold D-ring handle, which causes the arms to flail during ejection.

The unique seat ejection-actuation system of the present invention was specifically developed to overcome the foregoing problems of the D-ring-actuated system in a new and improved manner to be hereinafter described in the following summary and detailed description.

SUMMARY OF THE INVENTION

This invention consists briefly in an aircraft ejection seat-actuation mechanism that includes a handle member composed of a pair of identical and extendable left and right-hand handle portions that are pivoted at their inner ends to an upright support or pop-up stem member telescopically positioned in a storage stem member fixed to a main support. In accordance with the unique teachings of the present invention, both handle and pop-up stem members are normally held in a retracted and non-extended, compressed position, against the urging of separate, built-in spring elements, by a unique cover member that is pivotally mounted at its lower end, and is simply manually released and moved to an open position by a quick hand-blow thereon from the pilot or other aircrew member. When the said cover is so opened, the built-in spring elements respectively extend the combined handle and upright support-stem members vertically upward into a pop-up position, and further extend the left and right-hand handle portions outwardly into a convenient, opened and hand-gripping position between the legs of the pilot, or other aircrew member.

Another unique feature of the present invention resides in the novel provision of a relatively elongated rod member that is normally mounted in telescopic or concentric and compressed, locking relation within the pop-up stem member, against the urging of a built-in spring. For this purpose, an actuator lock element mounted in the handle member engages and holds the upper end, and thus the remainder of the rod member within the pop-up stem member. Said actuator lock element is automatically releasable by the manual operation, by the pilot or other aircrew member, of a trigger mechanism built into the handle member. Attached to the bottom end of said rod member is a cable that is interconnected with the firing mechanism for the ejection seat. Thus, on the release of the actuator lock member, by the manual operation of the handle member-trigger mechanism, the rod member is quickly repositioned upwardly into a pop-up position, which action naturally causes the simultaneous upward movement of the firing mechanism-cable attached thereto, and thus initiates operation of the firing mechanism and ejection of the seat.

Other objects and advantages of the present invention will become readily apparent hereinbelow from the following disclosure, taken in connection with the accompanying drawings, in which:

BRIEF DESCRIPTION OF THE DRAWINGS

FIGS. 1 and 1a are front and side-elevational views, respectively, depicting details of the closed position of the new and improved ejection seat-actuation system of the present invention;

FIG. 2 represents a rear view, showing details of the storage position of the inventive handle member;

FIG. 3 represents a second front view, illustrating the open or pop-up position of the inventive system;

FIG. 4 is a cross-sectional view, taken about on line 4—4 of FIG. 3, depicting details of the spring mechanism respectively used to move both pop-up stem and rod members to their active positions; and FIG. 5 shows a side perspective view, partly schematic and broken-away, illustrating details of the fired position of the inventive seat ejection-actuation system.

DESCRIPTION OF THE PREFERRED EMBODIMENT

Referring generally to the drawings and, in particular, to FIGS. 1, 1a and 2, the new and improved ejection seat-actuation system of the present invention, which is indicated generally at 10, is depicted as incorporating a novel and yet simplified, manually-operable cover member 11 that includes preferably integrally formed upper and lower cover positions, at 11a and 11b, the latter being pivotally mounted on its lower end at the pivot means 18. The front or forward side (FIG. 1) of each of said cover portions 11a, 11b is of a flat and closed configuration. The rear or back side (FIG. 2) of the upper cover portion 11a incorporates an identical, but mirror-image pair of handle member-receiving recesses 15 and 16 for receiving in compressed relation therewithin the improved handle member 19 comprising the left and right-hand handle portions, indicated respectively at 20 and 21 in the aforementioned FIG. 2 which shows the storage position thereof.

The aforementioned recesses 15 and 16 are formed partly by the incorporation on the forward or front side of the upper cover portion 11a of the side wall plate elements at 11c and 11d (Note Fig. 2), which actually provide the outside portions of the recesses. In addition, the inner or inside portions of the recesses 15, 16 is provided, at least in part, by the opposite walls 17a and 17b of an elongated housing member 17 that is centrally mounted on the front side of the cover member 11 and extends, for example, upward from a lower end at the bottom of the lower cover portion 11b to an upper end disposed within and on the front side of the upper cover portion 11a to thereby provide the respective recesses 15 and 16. Naturally, since the operation of the aforesaid cover member 11 requires that it be pivoted about the pivot means 18 in a forward direction away from the pilot, or other aircrew member, or, in other words, in the direction of the arrow "A" in FIG. 1a, to thereby expose and free the inventive handle member 19 and its support, both cover member 11 and the elongated housing member 17 are specifically made of an open configuration and thus incorporate open recesses on their front sides, as viewed in the aforementioned FIG. 2.

With specific reference again to FIG. 2 and, in addition, to FIG. 3, it is clearly seen that, within the open recess, indicated at 17c in FIG. 2, formed on the front side of the elongated housing member 17, is enclosed an elongated pop-up stem member 22 (FIG. 3) to the upper end which is pivotally mounted the left and right-hand handle portions 20 and 21. Of course, handle portions 20 and 21 are actually pivotally interconnected with each other by means of a centrally-disposed handle support-element at 28 to which the inner ends of the said handle portions 20, 21 are pivotally attached, as clearly shown. Said pop-up stem member 22 is uniquely telescopically or concentrically positioned within an elongated storage stem member 23 that is also mounted within the housing member 17, as is depicted in the closed position of the cover member 11 of FIG. 2. In the latter Figure, the pop-up stem member 22 is not visible since it is, of course, completely compressed into the storage stem member 23. When the cover member 11 is manually operated to its open position by a quick hand blow from the pilot, or other aircrew member, outwardly against a quick cover release element, indicated at 24, that is specifically provided for this purpose along the upper edge of the upper cover portion 11a, the cover member 11 pivots outwardly and then falls downwardly to its open position of FIG. 3, for example. At this moment, a relatively large diameter and elongated built-in and first, handle extension spring 24a (See FIG. 4), which has been held in a compressed condition between the bottom of the pop-up stem member 22 and the bottom of the storage stem member 23, when the cover member 11 is in its closed position of FIG. 2, for example, becomes immediately operative to quickly urge and move or reposition the said pop-up stem member 22, relative to, and upwardly out of the storage stem member 23, in a vertically extended, open and/or pop-up position, as is seen in the aforesaid FIG. 3. Simultaneously therewith, a second, relatively small, handle-extension spring built into each of the handle portions, as at 19a for the left-hand portion 20, likewise, becomes automatically operative to quickly snap each of the said pair of handle portions 20, 21 into their open, extended and hand-gripping position, also as is depicted in FIG. 3, for example. To ensure the controlled and relatively stable and enduring pivotal movement of said handle portions 20 and 21, the intermediately-positioned, handle-support element 28 has been machined to incorporate a relatively enlarged central portion 28a having a pair of reduced diameter or recessed portions, as at 28b, extending outwardly therefrom and forming a pivotal mounting means for the inner ends of the respective handle portions. These reduced diameter or recessed extension portions, as at 28b, are also formed with a partially arcuate-shaped surface, as at 28c, that provide a relatively close supporting fit with a similarly arcuated-shaped inner curved shape of end portion of each of said handle portions 20, 21. Each of the partially arcuate-shaped surfaces 28c of the aforementioned recessed portions 28b terminates in an abutment as at 28d, which limits the upward pivotal movement of said handle portions 20 and 21. A unique feature of this arrangement is that by having a pair of handle portions, as at 20 and 21, which are specifically designed to provide for a vastly improved hand-gripping means than is the case of the D-ring-type handle, and, in addition, by providing the automatic pop-up feature thereto, as previously discussed hereinabove, the pilot or other aircrew member can easily and quickly grip the respective handle portions with both hands and, by straightening his arms, will automatically assume the correct upright position, preparatory to initiating actuation of the firing mechanism and thus ejection of his seat. With the correct position thus assured, the previous problem of spinal misalignment is corrected, and with a much more easily held handle member, the previous problem of the loss of the hand-grip is likewise obviated. Of couse, with the pop-up stem member 22 being resiliently held in its extended position by its built-in spring 24a, pilots and other aircrew members of various sizes and arm reaches can be automatically accommodated.

To provide for the positioning of the inventive ejection seat-actuation system is an appropriate relation between the legs of the pilot or other aircrew member and thereby properly prepare for the subsequent initiation of the ejection seat-firing mechanism, a main supporting and relatively enlarged bracket, at 12, may be bolted as is clearly depicted in FIGS. 3 and 5, to the front bucket panel 13 of the aircraft seat, seen in schematic and partly broken-away form at 14. The previously-mentioned pivot means 18 may be mounted in suitable position on the said supporting bracket 12 by any appropriate mounting means, the specific details of which not being shown, since they are unimportant to the present invention. In this connection, it is noted that the pivot means 18 provides a pivot both for the cover member 11, as previously-noted, and for the storage stem member 23 (Note FIG. 5).

The inventive ejection seat-actuation system further includes, as another unique and improved feature, the incorporation of a novel, relatively elongated pop-up rod member 25, which is telescopically or concentrically mounted in slidable relation within the pop-up stem member 22. As is seen specifically in FIG. 4, the pop-up rod member 25 is normally retained in a locked, compressed position entirely within the pop-up stem member 22, against the normal upward urging of an ejection seat-release spring at 26, by means of an actuator lock device, indicated at 27 as being mounted in a recess provided therefor in the top or upper surface of the handle member 19, which recess is in open communication with the upper end opening of a passage in the pop-up stem member 22 in which the rod member 25 is compressed and slidably mounted.

When the decision has been made to eject, the user, after jettisoning the aircraft canopy and accomplishing certain essential steps, prepares to eject by, first, opening the cover member 11 with a sharp hand blow on the quick cover release 24. This action automatically removes a release pin, indicated at 29 in FIGS. 1, 1a and 4, from its engagement in normally-aligned openings at 30, 31 (note FIG. 3) and 25b, respectively formed in the pop-up and storage stem members 22 and 23, and in the pop-up rod member 25. These openings are in direct alignment with each other and engaged, as stated hereinabove, by the release pin 29 to thereby greatly assist in retaining said pop-up stem and rod members 22 and 25 in their contracted, compressed position within said storage stem member 23 when the cover member 11 is closed thereover. The removal of the cover member 11 from its enclosing position over the handle member 19 and the release pin 29 from its engaged position in the aforementioned aligned openings 25b, 30 and 31 immediately allows the pop-up stem member 22, and, of course, the pop-up rod member 25 carried therewithin, to elongate or, in other words, to move vertically upward and substantially in extended relation out of, and relative to the storage stem member 23, into its pop-up position of FIGS. 3 and 5, under the action of its spring 24a. In addition, the release handle extension springs, as at 19a, automatically cause both handle portions 20 and 21 to extend or open into the hand-gripping position shown, which is thereby predeterminedly placed at a convenient location between the user's legs. In fact, with the aforesaid elongation of the pop-up stem member 22 and the handle portions 20 and 21 into the position illustrated, the pilot or other aircrew member may easily reach and grasp the left and right hand handle portions 20 and 21 with the respective hand and, by straightening his arms, thereby automatically assuming the correct ejection posture.

The aforesaid correct ejection posture and, of course, the correct spinal alignment resulting therefrom is further improved and thereby assured by the use of another unique feature of the invention; namely, by additionally specifically pivoting the storage stem member 23 outwardly or forwardly about the previously-referred to pivot means 18 with its lower end, as is clearly illustrated in FIG. 5 in the direction of the arrow "B" until either the outermost limits of such pivotal movement has been reached, as controlled by the retention cable means at 37, or until his arms have fully or substantially fully straightened and his body has assumed the correct posture. The key feature of this pivotal action of the storage stem member 23 resides in its inherent and built-in accommodation of pilots and other aircrew members of different arm lengths and body configurations. Thus, by pushing out as far as it is necessary or until the limit of the retention cable 37 has been reached to assume an upright posture, the correct spinal adjustment will be ensured during the high "Q" forces of ejection.

After assuming the proper position and positive hand grip, by placing the hands, as is indicated schematically at 32 in FIG. 5, and thereafter ensuring the assumption of the correct upright position preparatory to initiating the actuation of the ejection seat-firing mechanism, by pushing outwardly in the direction of the arrow "B", as noted hereinbefore, the pilot or other aircrew member may then automatically unlock the previously-referred to actuator lock device 27 (Note FIG. 4) merely by depressing with the thumb either one of two release buttons or triggers, illustrated at 33 and 34 in FIG. 3, for example. In the aforementioned FIG. 4, the release button or trigger 34 is depicted, and it is depressable, operated or pushed against the action of its spring 34a, to be thereby pivoted about its pivot at 34b to thus release the locking engagement of its latch portion at 34c with a recess in the actuator lock device 27. This latter action frees the said actuator device 27 and thereby allows the seat release or pop-up rod member-spring at 26 to pivot the said device 27 about its pivot at 27a and quickly urge, and snap the rod member 25 vertically upward into its pop-up position, as is depicted schematically in FIG. 5 with the top portion thereof having moved out of the pop-up stem member 22. This latter position, which constitutes the ejection seat-released position, is uniquely and simply effective and the fired position, is uniquely and simply effective to initiate the firing of the firing mechanism and thus the ejection of the seat. This is accomplished through the simultaneous upward movement of an elongated and flexible firing cable at 35, which firing cable 35 is attached to the lower end of the pop-up rod member 25, as is most clearly visible in FIG. 4. Cable 35 naturally moves upwardly in the direction of the arrow "C", depicted in FIG. 5. To specifically provide for the upper limit of the upward movement into the pop-up position of FIG. 5 of the pop-up stem member 22 and naturally, the pop-up rod member 25, a combined guide and limit screw at 25a (Note FIG. 4) may be mounted, as shown, in the wall of the storage stem member 23 on one side thereof and project inwardly therefrom for slidable engagement within a slot 23a provided therefor in the said pop-up stem member 22. Also, the firing cable 35 may be of a predetermined length predesigned for a specific application and further incorporate a ball or other stop-type element on its lower end, as indicated at 35a, for engaging an actuator or seat release-catch member 36 to thereby operate the remainder of whatever additional actuator means that are necessary in a particular system to fire the ejection seatfiring mechanism. These means and the firing mechanism itself are not shown, since the particular details thereof are unimportant to the present invention. Obviously, a variety of such firing mechanisms and immediately interconnected actuating means therefor could be used without departing from the true spirit or scope of the invention.

Thus, a new and improved means for initiating actuation of an aircraft ejection seat has been developed by the present invention whereby an improved handle member is utilized that, when manually released, automatically pops-up and extends into a more convenient and easily reachable position for firm hand-gripping between the pilot's or other aircrew member's legs. Moreover, the handle support, by being angularly adjustable into different positions, positively ensures the natural assumption of the user into the correct postural alignment and, finally, the handle member is made of an inherently improved shape and is formed into left and right-hand portions to thereby provide for a more positive and stronger hold and thus ensure against the loss of hand grip during ejection.

We claim:
1. Means for initiating the actuation of the firing mechanism of an aircraft ejection seat, said means comprising; a main support mounted on, or adjacent to, the front bucket panel of the ejection seat; first, handle-support means mounted on said main support and incorporating extensible means for moving said handle-support means between a first, inner, contracted and closed position, and a second, outer, extended an open position; second, handle member means supported on said first, handle-support means and thus simultaneously movable therewith to a second, open position of relatively easy reachability between the legs of the pilot, or other aircrew member seated in the ejection seat; and third, firing mechanism-actuator means comprising; a first, manually-operable, actuator locking means built into the second, handle member means and manually actuatable between locking and unlocking positions; a second, rigid element means normally held in an inner compressed position at one end thereof by said first, actuator locking means; and a third, flexible cable means attached at one end thereof to the other end of said second, rigid element means and adapted to be interconnected at its other end to the ejection seat-firing mechanism.

2. Means for initiating the actuation of the firing mechanism of an aircraft ejection seat as in claim 1; and cover means pivotally mounted at its bottom end portion to said main support and manually movable from a first, closed position enclosing and retaining said first, handle-support means, and second, handle member means in their contracted, closed positions, and a second, open position releasing said first, handle-support means, and said second, handle member means to their second, extended and open positions.

3. Means for initiating the actuation of the firing mechanism of an aircraft ejection seat as in claim 2, wherein the extensible means of said first, handle-support means comprises a first, rigid storage stem member mounted at its lower end to said main support; and a second, rigid pop-up stem member telescopically positioned in said first, storage stem member, and having means normally urging said second, pop-up stem member upwardly to its extended position.

4. Means for initiating the actuation of the firing mechanism of an aircraft ejection seat as in claim 3, wherein said means for urging said second, pop-up storage member into its extended position comprises a built-in spring.

5. Means for initiating the actuation of the firing mechanism of an aircraft ejection seat as in claim 3, wherein said cover means comprises an upper, open cover portion normally receiving said second, handle member means in compressed relation therewithin when in its closed position; and an elongated open housing portion enclosing, receiving and holding said first and second stem members comprising said first, handle-support means in their first, inner, contracted and closed position therewithin.

6. Means for initiating the actuation of the firing mechanism of an aircraft ejection seat as in claim 5, wherein said second, handle member means comprises; an intermediately positioned, fixed element mounted in fixed relation directly to said second, pop-up stem member; and a left and right-hand handle-gripping portion respectively pivotally mounted in opposed relation to, and on opposite sides of said intermediately positioned, fixed element; said intermediately-positioned, rigid element and said left and right-hand handle portions being collectively confined within said upper cover portion, and each of said handle portions further incorporating built-in spring means normally urging said handle portions to their open, extended and hand-gripping position on the manual release of said cover means.

7. Means for initiating the actuation of the firing mechanism of an aircraft ejection seat as in claim 6, wherein said second rigid element comprises an elongated, rod member.

8. Means for initiating the actuation of the firing mechanism of an aircraft ejection seat as in claim 6, wherein said second rigid element comprises an elongated, rod member telescopically mounted within said second, pop-up stem member.

9. Means for initiating the actuation of the firing mechanism of an aircraft ejection seat as in claim 3; and projecting release pin means centrally affixed to said cover means and normally engaged within aligned openings incorporated within, and thereby holding said first and second stem members in inner telescopic relation to each other.

10. Means for initiating the actuation of the firing mechanism of an aircraft ejection seat as in claim 1, wherein said extensible means of said first, handle-support means comprises a first, upright, pop-up stem member supporting on its upper end said second, handle member means; and a second, upright, storage stem member enclosing said first, pop-up stem member in telescopic relation thereto; said second, storage stem member being pivotally mounted at its lower end to said main support to thereby facilitate the repositioning of the said second, handle member means to the most convenient location between the legs of the pilot, or other aircrew member for the application of the requisite hand grip and arm position thereof.

* * * * *